United States Patent
Dwork et al.

[11] Patent Number: 6,081,610
[45] Date of Patent: *Jun. 27, 2000

[54] SYSTEM AND METHOD FOR VERIFYING SIGNATURES ON DOCUMENTS

[75] Inventors: Cynthia Dwork, Palo Alto, Calif.; Moni Naor, Tel Aviv, Israel; Florian Pestoni, Buenos Aires, Argentina

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/586,020

[22] Filed: Dec. 29, 1995

[51] Int. Cl.⁷ .................................................. G06K 9/00
[52] U.S. Cl. ................................ 382/119; 380/4; 380/23; 380/30
[58] Field of Search ................................. 282/119, 120, 282/121, 122, 123, 137, 140; 280/3, 4, 23, 30, 25, 21

[56] References Cited

U.S. PATENT DOCUMENTS

| | | | |
|---|---|---|---|
| 4,385,285 | 5/1983 | Horst et al. | 382/119 |
| 4,868,877 | 9/1989 | Fischer | 380/25 |
| 4,993,068 | 2/1991 | Piosenka et al. | 380/30 |
| 5,202,930 | 4/1993 | Livshitz et al. | 382/122 |
| 5,339,361 | 8/1994 | Schwalm et al. | 382/119 |
| 5,469,506 | 11/1995 | Berson et al. | 380/25 |
| 5,533,141 | 7/1996 | Futatsugi et al. | 382/119 |
| 5,602,933 | 2/1997 | Blackwell et al. | 382/119 |

FOREIGN PATENT DOCUMENTS

0214609A2   3/1986   European Pat. Off. .......... H04L 9/00

OTHER PUBLICATIONS

C. Dwork, M. Naor, An Efficient Existentially Unforgeable Signature Scheme and its Applications, Advances in Cryptology–CRYPTO '94, 14th Annual International Cryptology Conference, Santa Barbara, California, pp. 234–246, Aug. 1994 Proceedings.

*Primary Examiner*—Joseph Mancuso
*Attorney, Agent, or Firm*—Romualdas Strimaitis; James C. Pintner

[57] ABSTRACT

A system and method are provided for producing verified signatures on documents such as checks and affidavits. Initially, a customer who is to obtain a verified signature, at some point in time, registers with a signatory authority, and a secret key, having public and private components, is established uniquely for that customer. When a document requires a verified signature, the customer presents the document and proof of his/her identity, such as a preprogrammed computer-interfacable card, to a signature system. Typically, such a system is to be available at an institution, such as an office, bank, or post office, where such services will routinely be used. The system accesses the archive of the private portion of the customer's key, and generates an encoded signature based, in part, on the content of the document. Accordingly, when a recipient of the document later wishes to verify the signature, the recipient uses the customer's public key to decode the signature. It is then straightforward to verify the signature against the content of the document.

6 Claims, 3 Drawing Sheets

SYSTEM AND METHOD FOR VERIFYING SIGNATURES ON DOCUMENTS

FIELD OF THE INVENTION

The invention generally relates to the field of communications. More specifically, the invention relates to the field of electronic processing of hard-copy forms.

BACKGROUND OF THE INVENTION

In the face of the modern-day revolution in electronic communications, hard-copy communication media, such as hard-copy mail and documents, are alive and well. In fact, a substantial segment of the communication field relies, to this day, on the use of hard-copy documents which bear a human signature, typically that of the originator or sender of the document.

One example of such documents is the personal check, written against a party's bank account, and signed by that party. Another example is affidavits, the class of forms or other documents which are required to be signed. Sometimes, affidavits must even be signed under oath, for instance signed while a notary public witnesses the signature. A common category of affidavit-type forms is Internal Revenue Service tax forms.

Many types of hard-copy documents require some sort of processing. Typically, a sender generates the document to provide a recipient with some sort of information which the recipient requires. In the case of personal checks, for instance, the sender, who makes out the check, wishes to transfer funds from an account to the recipient.

Processing by the recipient generally involves extracting information from the document and taking suitable action based on the content of the extracted information. For instance the recipient of a check, a creditor of the sender, extracts the dollar sum from the check and identifies the sender, so that the recipient can credit the sender for the payment.

Processing hard-copy documents can be a complex and labor-intensive task, depending on the type of forms and the sort of information the documents bear. Various mechanisms for handling documents, and scanning them to extract information for them, have been developed. Because of the sheer volume of checks and other such documents, such automated handling and scanning is a virtual necessity. For instance, banks use automatic handlers and scanners to extract information from checks. To accommodate these systems, checks are printed with machine-readable inks using standardized, machine-recognizeable character sets.

However, one particular problem, which automatic systems have not handled in a satisfactory manner, is that of verifying signatures. In the case of checks, for instance, a bank will typically have on file a sample signature of an account holder. Any check drawn against the account holder's account should bear the account holder's signature. Ideally, for each check, the bank should verify the signature on the check against the sample signature.

Validating a signature, however, is not an easy task, since an individual's handwriting inevitably has certain variations from one sample to another. A human clerk, visually comparing the signatures, might well be able to both (i) recognize an authentic signature even though it does not identically match a sample signature on record, and (ii) tell the difference between an authentic account holder's signature and someone else's signature. An automatic system, on the other hand, would require sophisticated artificial intelligence and/or pattern-recognition technology to even make the attempt.

As a practical matter, institutions handling signed hard-copy documents have sometimes avoided the time and manpower costs by simply refraining from routinely comparing signatures. This failure to verify a signature raises the possibility that, for instance, a bank might honor a fraudulent check with a non-matching signature, with no one being the wiser until the account holder notices the fraudulent debit from his or her account.

Therefore, there is a need for a system and method for verifying signatures which is effective to recognize false signatures, while being efficient enough to avoid the time and manpower costs required for human signature verification.

SUMMARY OF THE INVENTION

It is an object of the invention to provide such a system and method for verifying signatures which is effective to recognize false signatures, while being efficient enough to avoid the time and manpower costs required for human signature verification.

To achieve this and other objectives, there is provided in accordance with the invention a signature verification method for use with a document which is to bear a signature by a customer. The method comprises the following steps:

A database of keys is maintained, the keys being associated with respective parties, including the customer, who are to make signatures that are to be verified using the signature verification method of the invention, each of the keys including a securely archived provate key and a publically available public key.

When a customer needs a signature for a document, a digital signature is generated, employing the customer's private key; the signature being based on the content of the document. The signature is associated with the document, such as by printing the signature on the document.

A recipient of the document decodes the signature, using the customer's public key, thereby verifying that the customer signed the document because the customer's private key was used.

Finally, the recipient verifies the content of the document against the decoded signature, thereby verifying that the signature was made for the document.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

In accordance with the invention, a signature is generated for a document, using a secret key. The secret key is preferably implemented as per the well-known public/private key system of RSA Data Security, which is well-known in the field of cryptography. In such a system, a given customer is assigned a unique secret key, having a public key and a private key component.

It is a characteristic of the key components that, if either one is used to encrypt a plaintext message, the other decodes the encrypted message. Further, given the public key component, it is computationally infeasible to generate the private key component.

Therefore, a sender can encrypt a message intended only for the eyes of a recipient, using a recipient's public key, and send the encrypted message, knowing that only the recipient has the private key necessary to decrypt the message. On the other hand, a sender can encrypt a message using the sender's private key, so that any recipient who decrypts the message using the sender's public key knows that the message must have originated from the sender, because only the sender has the sender's private key.

The method of the invention takes advantage of the workings of such a scheme, by using the latter characteristic, to establish with certainty that the signature is that of the sender, or of a sender's authorized agent.

Figure 1:
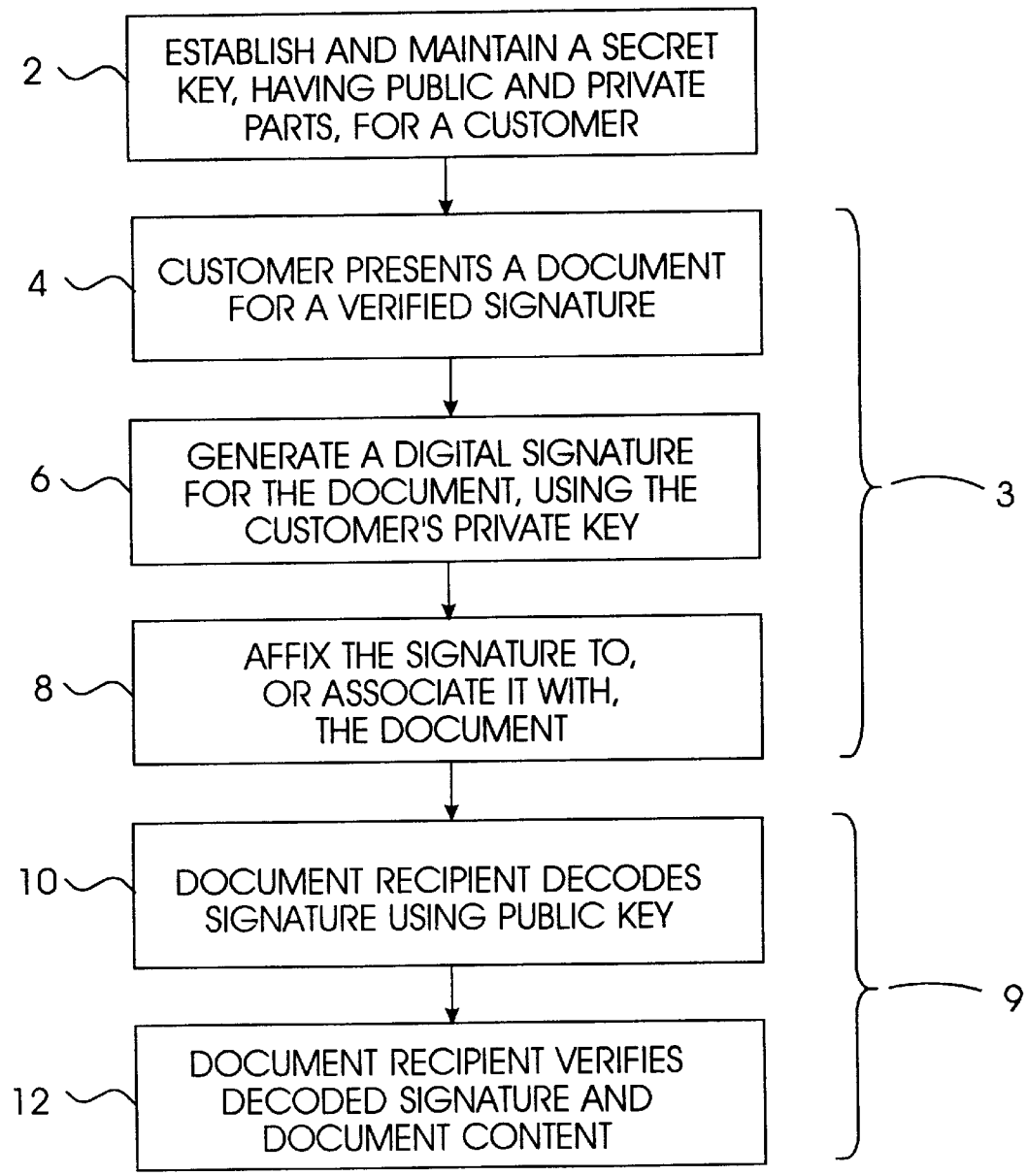
FIG. 1 is a high-level flowchart showing the method of the invention.

FIG. 1 is a high level flowchart of the method of the invention. Separate steps, which form novel and non-obvious aspects of the invention, take place at different times. The steps shown in FIG. 1 are grouped, based on times at which the steps preferably take place.

Initially, step 2 of the method includes establishing and maintaining a secret key, such as the public/private key referred to above, associated with a respective customer, who is to provide a document requiring a signature. Preferably, a database of such keys is established, each customer having a public key, available to any interested party, and a private key, known only to the customer. The private key is archived in a suitably secure way, and the public key is made available to the public.

A preferred format for the public key is a two-dimensional code signed with a system key which is maintained by the system, and over which an authorized system administrator has control.

Also, a customer can request that his/her key be notarized. This is preferably done as follows: the customer presents the two-dimensional code signed with the system key, and proof of the customer's identity, to an authority. The authority then produces a two-dimensional encoding of the key presented, signed with the private key of the authority.

It is expected that, in typical, preferred implementations of the invention, step 2 takes place as a customer registers for services provided by the invention, possibly before the customer has a document for which he/she requires a verified signature.

When such a database is in place, a customer provides a document for a signature (step 4). Step 3 of FIG. 1, which collectively incorporates steps 4, 6, and 8, shows the activities associated with generating the signature.

In step 6, a digital signature is generated for the document, using the customer's secret key. Preferably the private key component of the customer's secret key is used. Also, the signature is preferably generated using, as input information, data pertaining to the document itself, such as a scanned bit map of the document. Therefore, the signature produced by step 6 is unique to the customer by virtue of its use of the customer's private key, as well as being unique to the document, by virtue of being based on the content of the document. Accordingly, the signature is demonstrably authentic with regard to both the document and the customer.

Figure 2:
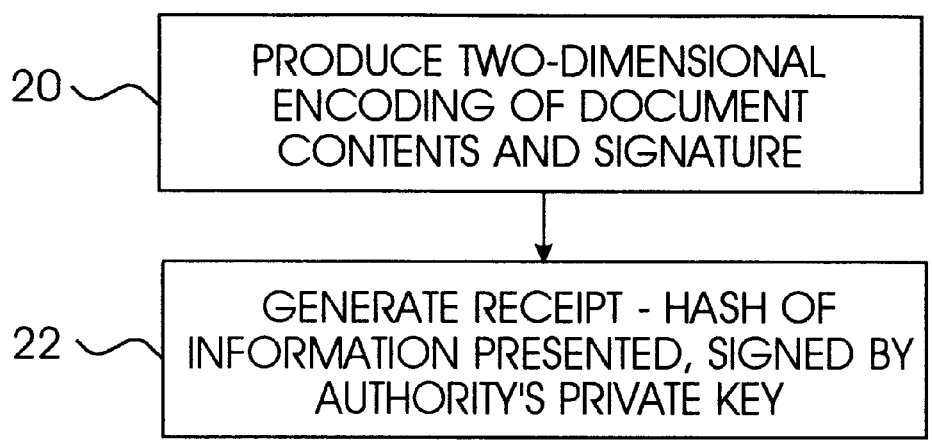
FIG. 2 is a flowchart showing a more detailed implementation of a step of the flowchart of FIG. 1.

A preferred implementation of step 6, given in FIG. 2, includes producing a two-dimensional encoding of the content of the document, as well as the signature (step 20). The appropriate authority responds with a receipt in the form of a hash of the information presented, signed with the private key of the authority (step 22). Accordingly, no further proof of the costomer's identity needs to be shown. Thus, forms can be sent by mail.

It is understood, also, that a signatory authority, such as a notary public or other suitable official, can also produce a signature as described above. Such a signature would likewise be demonstrably authentic.

In accordance with the invention, step 6 may be executed in a fashion which further protects the secrecy of the key. Consider, for instance, an environment in which a customer wanted to sign a check, although eavesdroppers might learn the key, and then be able to use it so sign fraudulent checks. To protect the secrecy of the customer's key, step 6 is preferably executed using a technique which makes eavesdropping difficult or impossible.

In a preferred implementation, a customer uses a data carrier, preferably in card form, including an on-board processor and memory, which he or she carries, and utilizes, in a fashion comparable to an ATM card. A suitable machine, at a bank or post office, is used along with the card (see FIG. 4). One example of a card believed to be suitable for use in accordance with the invention is a card produced by Hexaglot Warenhandels GmbH, under the trade name "Smartcard by Hexaglot".

Figure 3:
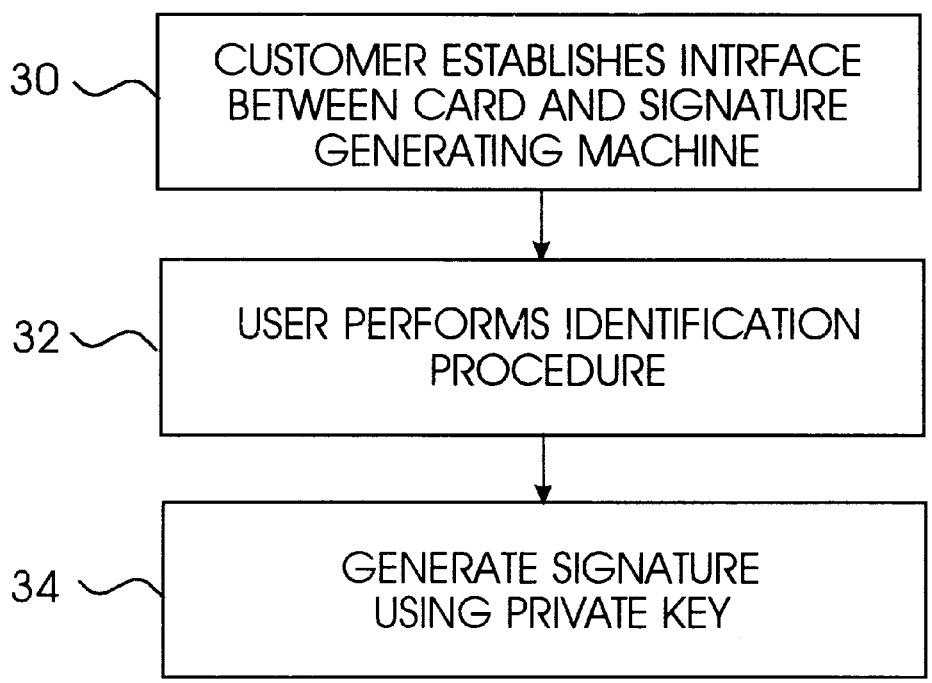
FIG. 3 is a flowchart showing a more detailed implementation of a step of the flowchart of FIG. 1.

FIG. 3 gives a more detailed implementation of step 6 of FIG. 1, using the above-described card. Initially, an interface 40 is established between the card 42 carried by the customer and a machine (such as a processor 44) for generating the signature (step 30). Then, the customer established his/her identity (step 32), using a suitable procedure such as keying in a secret identification code to a user interface 46. Depending on the type of processing machine, and the environment in which the customer is to use the machine, other identification procedures, which would be better suited to protect customer confidentiality, may alternatively be used.

Figure 4:
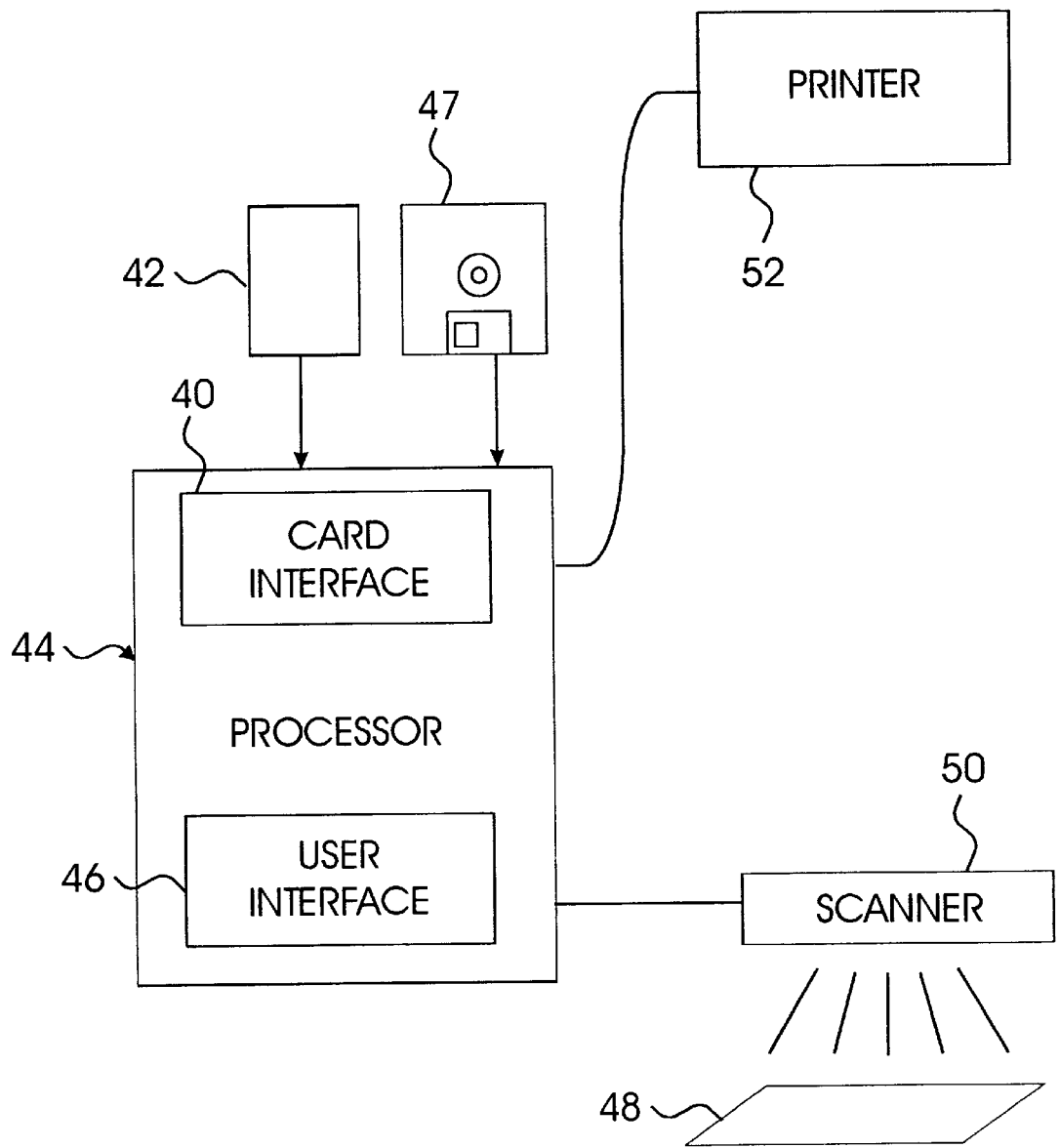
FIG. 4 is a block diagram of a system for practicing the method of the invention.

Note that the processor 44 may be a general purpose computer, which executes the method of the invention by running software program code, which may be commercialized and made available using a pre-recorded product such as a floppy disk 47, which is purchased through a software vendor and installed in the processor, as shown by the arrow in FIG. 4. Alternatively, if the program code is distributed over a communication medium such as the Internet, then the floppy disk 47 is replaced by a computer-usable interface to the Internet.

Then, the customer instructs the system to generate a signature for the document (step 34). This may involve scanning the document (shown as 48 in FIG. 4) using a scanner 50, so that the signature will reflect the content of the document, as discussed above.

A signature scheme preferably should be used which is existentially unforgeable. The term "existentially unforgeable" is defined, formally, as follows: Where S(m) denotes a signature on a message m, given any polynomial (in the security parameter) number of pairs of messages and signatures $$\{(m_1, S(m_1)), (m_2, S(m_2)), \ldots (m_k, S(m_k))\},$$

the signature scheme S is existentially unforgeable if, for any message $m_{k+1}$ which is not an element of the set of messages $m_1$ through $m_k$, it is computationally infeasible to generate a message/signature pair $(m_{k+1}, S(m_{k+1}))$ A preferred signature method is that disclosed in Dwork et al., "An Efficient Existentially Unforgeable Signature Scheme and its Applications", published in Desmect (Ed.), Advances in Cryptology—CRYPTO '94, 14th Annual Cryptology Conference, Santa Barbara, Calif. (Aug. 21–25, 1994).

Following step 6 of FIG. 1, in step 8, the signature so generated is associated with the document. Preferably, for hard-copy documents, the signature is printed, using a printer 52. The printed signature may be printed directly onto, or otherwise affixed to, the document 48 itself.

At this point, the preparation of the signature is complete. In instances where the signed document is to be forwarded to a recipient, the recipient performs additional steps, in accordance with the invention, at the later time at which the recipient receives and processes the document. The further activities which take place at that time are shown in FIG. 1 generally as step 9.

Initially, the recipient decodes the signature using the public component of the sender's secret key (step 10). In typical foreseeable applications of the invention, such as the situation in which the document is a check, the recipient will have access to a database of public components of the secret keys of various customers. Thus, step 10 is implemented by accessing the sender's public key from the database.

After the public key is obtained, the signature is decoded. Then, it is a straightforward matter to verify the signature and the content of the document (step 12).

It is believed that the invention has applicability in a number of different fields. For instance, the invention could be integrated into a financial software package, such as Intuit'S Quicken® product. The resultant software package would enable a user to print and sign a check at the press of a button. In addition to the ledger-maintenance and other features already offered by such a package, the addition of the invention would advantageously add the capability of printing a check, together with a robust two-dimensional array code representation of all relevant information (e.g., the content of the check, the date, etc.) and a digital signature. Similarly, other signed documents, such as tax returns, may be prepared Such a system could be used with a large-scale payroll system for a large corporation, a system for preparing stock divident checks, or, in general, for any situation in which the preparation of checks causes a significant consumption of time. Also, as an added function of a payroll system in accordance with the invention, an employee can request a machine-readable, digitally signed W2 form, or other form, and request that the form so generated be mailed to the employee's address of record.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A signature verification method for use with a hardcopy document which is to bear a signature by a customer, the customer having a secure private key, the customer's private key corresponding with a publicly available public key, the method comprising the steps of:

generating a digital signature, employing the customer's private key; the signature being based on the content of the hard-copy document, the step of generating employing an existentially unforgeable signature scheme associating the signature with the hard-copy document;

decoding the signature based on the customer's public key, thereby verifying that the customer signed the hard-copy document because the customer's private key was used; and verifying the content of the hard-copy document against the decoded signature, thereby verifying that the signature was made for the hard-copy document.

2. A signature verification method as recited in claim 1, wherein the step of maintaining a database of keys includes the steps of:

generating a key; and notarizing the key.

3. A signature verification method as recited in claim 2, wherein:

(i) the step of maintaining a database of keys includes the steps, executed for a customer, of:

generating a key pair including a private key and a public key, storing the private key in a secure way, and outputting the public key as a two-dimensional code; and (ii) the step of notarizing includes the steps of:

presenting the two-dimensional code and proof of the customer's identity to an authority, the authority having a private key, generating a two-dimensional encoding of the key presented, the encoding including a signature of the private key of the authority, and presenting the two-dimensional encoding of the key presented, signed with the private key of the authority, as a receipt to the customer.

4. A signature verification method as recited in claim 2, wherein the step of (iii) outputting includes outputting the public key as a two-dimensional code signed using a predetermined system key.

5. A signature verification method as recited in claim 1, wherein the step of generating a digital signature includes establishing the customer's identity.

6. A signature verification method as recited in claim 5, wherein:

the step of maintaining a database of keys includes issuing the customer an identity card programmed with information regarding the customer's identity; and the step of establishing the customer's identity includes:

(i) establishing an interface between the identity card and a signature system having an identity card interface and a user interface, and (ii) the user interactively performing an identification procedure, using the user interface, wherein the user's identity is established based on the programming of the identity card.

* * * * *